Patented May 15, 1951

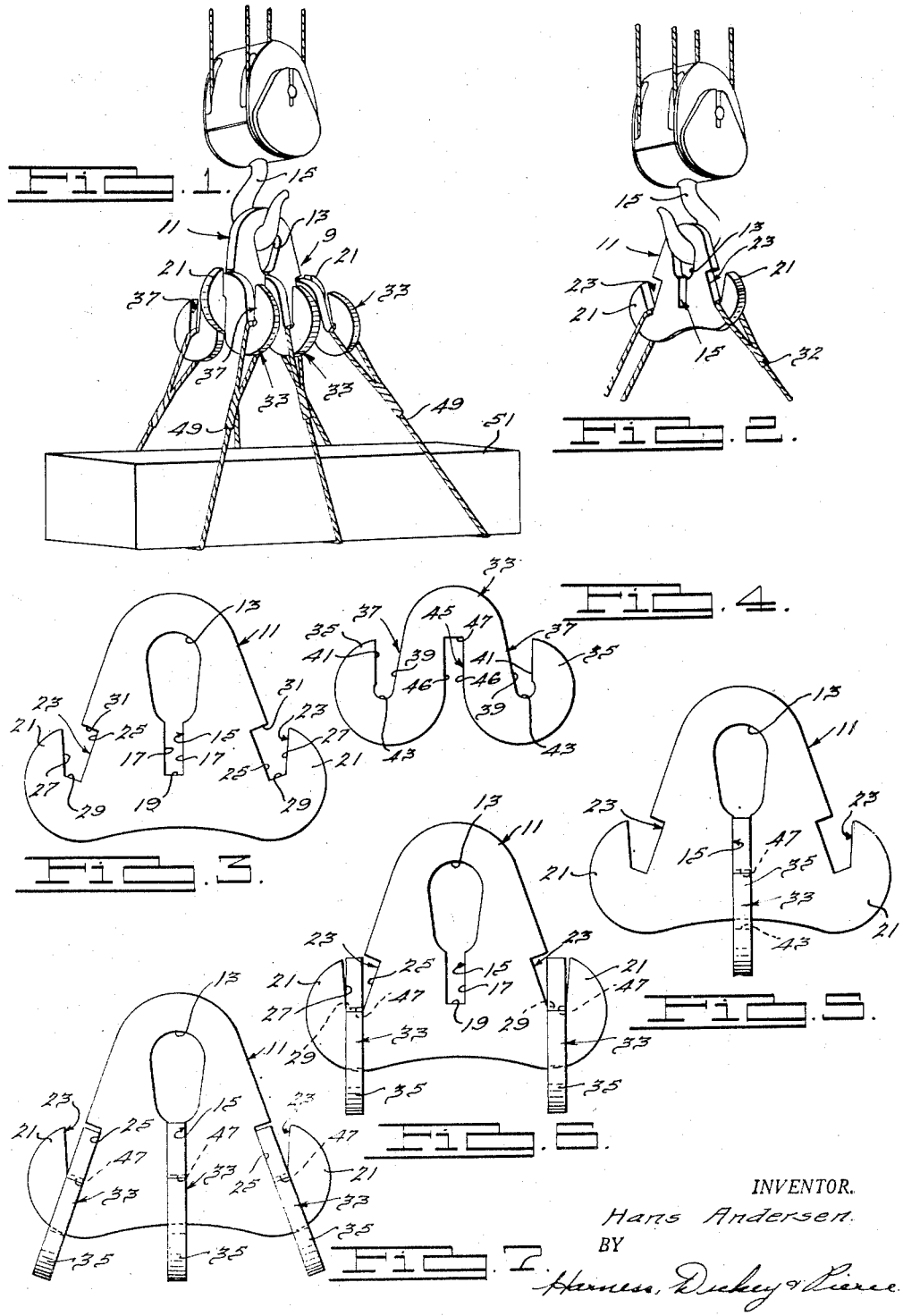
INVENTOR.
Hans Andersen

2,552,758

UNITED STATES PATENT OFFICE 2,552,758

HANDLING DEVICE

Hans Andersen, Detroit, Mich.

Application October 1, 1947, Serial No. 777,132

23 Claims. (Cl. 294—82)

This invention relates to a handling device of the type adapted to be carried by a crane for lifting various types of loads, and more particularly to a hook-type handling device which can be used selectively from a one to a six-way hook.

The handling device of the present invention has been devised to facilitate easy handling of various types of loads which are to be picked up and moved by a conventional handling crane or derrick. At the present time, in order for a crane to properly handle loads of various sizes, shapes, and weights, different types of handling or hook devices are used, in accordance with the type of load which is to be moved. Likewise, different loads require different rope, cable, or chain sling arrangements, in order to properly carry and balance the same, and different handling or hook devices must be used for the various types of sling arrangements. However, with the present invention, a universal handling device is provided which may be easily rearranged for use in carrying various types of loads, with various types of sling arrangements, without necessitating the use of a number of different handling devices. The handling device of this invention employs a main double hook so arranged and constructed that it is adapted to receive one or more auxiliary hooks which may be quickly connected thereto in order to provide the necessary number of hooks for properly handling the particular load to be lifted.

The principal objects of this invention, therefore, are to provide an improved universal hook-type handling device which is relatively inexpensive to manufacture, rugged in construction, especially efficient in operation and safe to use; to provide a handling device of the aforementioned type which can be easily and quickly rearranged so as to selectively provide from a one to a six-way hook-type handling device; to provide an improved handling device of the type including a main double hook, and, if desired, a plurality of auxiliary hooks, which is so constructed that the auxiliary hooks are pivotally connected to the main hook so as to eliminate any torsional loading of the hooks, regardless of the angle of extension of the lifting slings; to provide a handling device of the aforementioned type in which the auxiliary hooks may be quickly and easily removed from the main hook, and in which the auxiliary hooks cannot accidentally become disengaged from the main hook; to provide a handling device of the aforementioned type which is properly balanced regardless of whether auxiliary hooks are used or not, so that loads of various sizes, shapes, and weights may be efficiently carried without any danger of dropping the same; to provide a universal handling device of the aforementioned type to which different lengths and types of cable slings may be connected for efficiently carrying desired loads; to provide generally an improved handling device which is more efficient in operation, easier to use, and more durable than any other heretofore known in the art.

These and other objects of the invention will become apparent from the following detailed description taken in conjunction with the accompanying drawing in which:

Figure 1 is a perspective view of a handling device of this invention connected to a crane hook and arranged as a six-way hook carrying a load;

Fig. 2 is a view similar to Fig. 1 illustrating the handling device arranged as a two-way hook;

Fig. 3 is a front elevational view of the main hook of the handling device;

Fig. 4 is a front elevational view of one of the auxiliary hooks of the handling device;

Fig. 5 is a front elevational view of the handling device illustrating one arrangement for providing a four-way hook;

Fig. 6 is a front elevational view of the handling device illustrating a different arrangement for providing a four-way hook, and Fig. 7 is a front elevational view of a handling device arranged as a six-way hook with the outboard auxiliary hooks in an inclined position with respect to the longitudinal axis of the main hook.

Referring now to the drawing, it will be seen that the handling device of this invention is generally indicated at 9. The handling device 9 includes a main, double sheet-metal hook 11 which is formed with a central keyhole-type opening 13, in which a conventional crane hook 15 is adapted to be received for lifting the handling device and the load carried by the latter. Extending downwardly from the lower end of the keyhole opening 13 is a slotlike opening 15 which is formed with substantially flat side walls 17 and a substantially flat bottom wall 19. The main hook 11 is formed with outwardly and oppositely turned ends 21 which define slotlike upwardly directed openings 23, equally spaced on each side of the longitudinal axis of the hook. The openings 23 are each formed with substantially flat inner and outer opposed side walls 25 and 27, respectively. The inner side wall 25 is disposed on a substantially 45° angle with respect to the longitudinal axis of the hook 11, and the side walls 25 and 27 diverge upwardly with respect to each other so that the distance between the side walls 25 and 27 is greater at the upper end of the opening than at the lower end thereof. The bottom wall 29 of the opening 23 extends substantially perpendicular to the inner wall 25 so as to be inclined with respect to the horizontal. The upper end of the wall 25 terminates in an outwardly projecting lip or upper wall portion 31 which partially encloses the upper end of the opening 23.

The main hook 11 may be used singly as a one or two-way hook-type handling device, as illustrated in Fig. 2, wherein the opposite looped ends of a sling 32 are disposed in the openings 23 so as to be connected to the opposite sides of the hook and extend around a particular load to be lifted. The two-way hook arrangement shown in Fig. 2 has, as is obvious, a limited use and is generally used for lifting certain types of loads, such as those which are relatively light in weight and easily balanced by means of one or two cables.

When it is desired to provide from a three to a six-way hook device, auxiliary hooks, generally indicated at 33, are provided, and which are detachably connectible to the main hook 11 as will be hereinafter described. Each of the auxiliary hooks is identical in construction, and as can be seen in Fig. 4, each is formed with outwardly and oppositely turned ends 35 which define upwardly directed openings 37, equally spaced on opposite sides of the hook. The openings 37 are formed with substantially flat inner and outer side walls 39 and 41, respectively, and the side walls 39 and 41 are joined at their lower ends by an arcuate bottom wall 43. The bottom wall 43 of each opening is rounded so as to fully support the portion of a sling disposed in each opening 37, as will be hereinafter brought out. Each auxiliary hook 33 is formed with a downwardly directed, central slot-like opening 45 which has opposed substantially flat side walls 46 and a substantially flat upper end wall 47, which extends perpendicular to the side walls of the slot 45. Both the auxiliary hooks 33 and the main hook 11 are preferably made of boiler plate, or the like, of a substantial thickness, such as 1¼″ and 1½″ stock, so as to be strong enough to lift the necessary loads which must be carried by a handling device of this type.

A three or four-way hook may be provided by connecting the auxiliary hooks 33 on the main hook 11 in one of two ways. For instance, as illustrated in Fig. 5, one of the auxiliary hooks 33 is detachably connected to the main hook 11 by inserting one end of an auxiliary hook 33 through the main hook keyhole opening 13 and slot 15 until the slot 45 registers with the slot 15. The auxiliary hook 33 is then dropped into the main hook slot 15 so that the slot side walls 46 of the auxiliary hook overhang the opposite side faces of the hook 11 below the slot 15. The distance between the side walls 46 of the slot 45 is just slightly greater than the thickness of the main hook 11 so that the opposite slot side walls 46 of the auxiliary hook 33 are adapted to bear against the opposite side faces of the main hook 11 and prevent rotation or accidental displacement of the auxiliary hook from the main hook. This arrangement thus provides four opposed terminal hooks or horns to which one or more cable slings may be connected for lifting certain types of loads.

For certain other types of loads and sling arrangements, it may be desired to provide a three or four-way hook of the type illustrated in Fig. 6, wherein a pair of the auxiliary hooks 33 are disposed in the outboard openings 23 of the main hook 11, and the central slot 15 of the main hook is not used. With this arrangement, the side walls of the slot 45 of each auxiliary hook 33 again overhang the portion of the main hook 11 below the openings 23 so that the side walls 46 of the auxiliary hook slot 45 will bear against the side faces of the main hook and prevent any accidental displacement of the auxiliary hook. It will be noted that the dimension between the side faces 25 and 27 of the main hook opening 23, adjacent the bottom wall 29 thereof, is such that when the auxiliary hooks are disposed in the openings 23, and in a vertical plane, the opposite edges of the upper wall 47 of the slot 45 will engage the inner and outer side walls 25 and 27 so as to support the auxiliary hooks in the main hook openings. When the auxiliary hooks are in this position, the outer face of each will substantially abut the outer wall 27 of the openings 23. It will be noted that the auxiliary hooks 33 may pivot in the hook openings 23 so as to be supported in an inclined position with respect to the longitudinal axis of the main hook 11 (Fig. 6); that is, with the inner face thereof abutting the inclined inner wall 25 of the main hook opening 23 and with the upper wall 47 of the slot 45 in line engagement with the bottom wall 29 of the opening 23. This is a very important advantage of this construction, in that it permits the auxiliary outboard hooks 33 to pivot with respect to the main hook 11 so that if the outboard hooks are connected to slings which extend outwardly at an angle with respect to the main hook, as illustrated in Fig. 1, no torsional loading of the hooks will occur which will cause undue breakage. When the handling device is arranged to provide the four-way hook device illustrated in Fig. 6, one or more slings may be connected in the opposed openings 37 of the auxiliary hooks 33 so as to more effectively carry certain types of loads.

In order to provide a handling device of the six-way hook-type, the parts are arranged as illustrated in Fig. 7, wherein one auxiliary hook 33 is detachably connected in the central main hook slot 15, as previously described, and two other auxiliary hooks 33 are detachably connected in the outboard main hook openings 23, as previously described. The importance of having the outboard auxiliary hooks 33 pivotally mounted in the main hook openings 23 is again apparent with this arrangement, for as shown in Fig. 1, the outboard hook slings 49 extend angularly downwardly so as to pass underneath the object to be lifted 51, adjacent the outer ends thereof. The auxiliary hooks thus must assume the inclined position (Fig. 6) in order to prevent torsional loading of the same. The six-way hook arrangement is used for extremely heavy loads and for loads which are difficult to properly lift with the other arrangements.

It will thus be seen that the handling device of this invention may be selectively used as from a one to six-way hook and converted from one arrangement to the other in a relatively simple manner by merely adding or removing one or all of the auxiliary hooks from the main hook 11. In this way, a single handling device is provided which is adapted for use in lifting various types, sizes, and shapes of loads with various types of sling arrangements. Likewise, it will be appreciated that this handling device, in addition to being versatile, is especially rugged and safe to use.

I claim:

1. A double sheet-metal main hook formed with outwardly and oppositely turned ends defining slotlike upwardly directed openings, and a pair of auxiliary hooks each having a downwardly directed slotlike opening adapted to overhang and bear against the sides of said main hook below said openings therein.

2. A double sheet-metal main hook formed with outwardly and oppositely turned ends defining slotlike upwardly directed openings, and a pair of double auxiliary hooks each having a central downwardly directed slotlike opening adapted to overhang and bear against the sides of said main hook below the openings therein.

3. A double sheet-metal main hook formed with outwardly and oppositely turned ends defining slotlike upwardly directed openings, said main hook having an opening therein disposed substantially centrally with respect to said upwardly directed openings and a downwardly extending slot communicating with said central opening, and a plurality of auxiliary hooks each having a downwardly directed slotlike opening adapted to overhang and bear against the sides of said main hook below the upwardly directed main hook openings and the downwardly extending main hook slot.

4. A double sheet-metal main hook formed with outwardly and oppositely turned ends defining slotlike upwardly directed openings, said main hook having an opening disposed substantially centrally with respect to said openings and having a slot extending downwardly from the lower end of said opening, and a plurality of auxiliary double hooks each having a central downwardly directed slotlike opening adapted to overhang and bear against the sides of said main hook below the openings and slot therein.

5. A double sheet-metal hook formed with outwardly and oppositely turned ends defining slotlike upwardly directed openings having substantially flat inner and outer side walls, said inner side walls being disposed on a substantially 45° angle with respect to the longitudinal axis of said hook, said inner and outer side walls of each of said openings diverging upwardly with respect to each other so that the distance between said walls is greater adjacent the upper end of said opening than at the lower end thereof, whereby an auxiliary hook of substantially the same thickness as the dimension between the hook side walls at their lower ends may be disposed in each of said hook openings and is free to swing between a vertical and inclined position with respect to the central axis of said hook.

6. A double sheet-metal hook formed with outwardly and oppositely turned ends defining slotlike upwardly directed openings having substantially flat inner and outer side walls, said side walls diverging upwardly with respect to each other whereby the distance between the side walls adjacent the upper end of each of said openings is greater than the distance adjacent the lower end of said opening so that an auxiliary hook of substantially the same thickness as the distance between the side walls of said openings adjacent the lower end thereof may be disposed in each of said openings and will be able to pivot from a vertical position to an inclined position with respect to the longitudinal center axis of said hook.

7. A double sheet-metal main hook formed with outwardly and oppositely turned ends defining slotlike upwardly directed openings having substantially flat inner and outer side walls, said side walls diverging upwardly with respect to each other so that the dimension between said side walls adjacent the upper end of said opening is greater than at the lower end of said opening, and an auxiliary hook having a downwardly directed slotlike opening adapted to overhang and bear against the sides of said main hook below one of the openings therein, the thickness of the metal of said auxiliary hook being such that when said auxiliary hook is disposed in said opening in a parallel relation to the central axis of said main hook the opposite side faces of said auxiliary hook will engage the inner and outer side walls of said openings, and when said auxiliary hook is swung to an inclined position with respect to said main hook central axis, the inner face of said auxiliary hook will abut the inner face of said main hook opening and will rest upon the bottom wall of said main hook opening.

8. A double sheet-metal main hook formed with outwardly and oppositely turned ends defining slotlike upwardly directed openings having substantially inner and outer side walls, said side walls diverging upwardly with respect to each other and said inner side wall being disposed on an angle with respect to the longitudinal axis of said main hook, and an auxiliary hook having a downwardly directed slotlike opening adapted to overhang and bear against the sides of said main hook below one of the openings therein, said auxiliary hook when overhanging said main hook being adapted to be moved between a vertical position and an inclined position with respect to the longitudinal axis of said main hook.

9. A double sheet-metal main hook formed with outwardly and oppositely turned ends defining slotlike upwardly directed openings having substantially flat opposed inner and outer side walls, said side walls diverging upwardly with respect to each other and said inner side wall being disposed on an angle with respect to the longitudinal axis of said main hook, said main hook having an opening disposed substantially centrally with respect to said upwardly directed outer opening and a slot extending downwardly from the lower end of said central opening, and a plurality of auxiliary hooks each having a downwardly directed slotlike opening adapted to overhang and bear against the sides of said main hook below the openings and slot therein, said auxiliary hooks adapted to be disposed in said outer opening being of such a thickness that they may seat in the bottom of said outer openings and move between a vertical and inclined position in said openings with respect to the central axis of said main hook.

10. A double sheet-metal main hook formed with outwardly and oppositely turned ends defining slotlike upwardly directed openings, and at least one auxiliary hook having a downwardly directed slotlike opening therein overhanging and adapted to bear against the sides of said main hook below the opening therein, said auxiliary hook having outwardly and oppositely turned ends defining slotlike upwardly directed openings therein and being detachably connected to said main hook.

11. A double sheet-metal main hook formed with outwardly and oppositely turned ends defining slotlike upwardly directed openings having opposed substantially flat inner and outer walls, said walls diverging upwardly with respect to each other so that the distance between said walls is greater adjacent the upper end of said opening than at the lower end thereof, at least one auxiliary double hook having a downwardly directed slotlike opening overhanging and adapted to bear against the sides of said main hook below the opening therein, said main hook openings being dimensioned so as to receive said auxiliary hook therein with the upper wall of said auxiliary hook slotlike openings engaging the lower wall of said main hook openings when said auxiliary hook is disposed at an angle to the longitudinal axis of said main hook and so that the upper wall of said auxiliary hook slotlike opening engages the opposed inner and outer walls of said main hook openings when said auxiliary hook is disposed in a plane substantially parallel to the longitudinal axis of said main hook, said auxiliary hook being removable from said main hook.

12. An auxiliary hook adapted to be detachably connected to a main hook and being formed with outwardly and oppositely turned ends defining slotlike upwardly directed openings having substantially flat opposed walls, said hook having a downwardly directed slotlike opening therein disposed substantially midway between said outer openings and terminating substantially below the upper central portion of said hook so that when said auxiliary hook is connected to a main hook with its central downwardly directed slot overhanging a portion of said main hook the side walls of said central auxiliary hook slot will be adapted to bear against the side walls of a main hook and prevent said auxiliary hook from being accidentally displaced from said main hook.

13. A double sheet-metal main hook formed with outwardly and oppositely turned ends defining slotlike upwardly directed openings, said main hook having an opening disposed substantially centrally with respect to said outer openings and a slot extending downwardly from the lower end of said central opening, an auxiliary hook having a downwardly directed slotlike opening adapted to overhang and bear against the sides of said main hook below the slot in said main hook.

14. A double sheet-metal main hook formed with outwardly and oppositely turned ends defining slotlike upwardly directed openings, said main hook having an opening therein disposed centrally with respect to said outer openings and a slot extending downwardly from the lower end of said central opening, and an auxiliary double hook having a downwardly directed central slotlike opening adapted to overhang and bear against the sides of said main hook below said slot so as to be detachably connectible to said main hook.

15. A double sheet-metal main hook formed with outwardly and oppositely turned ends defining upwardly directed and diverging slotlike openings, an auxiliary hook having a downwardly directed slotlike opening therein adapted to overhang and bear against the sides of said main hook below the openings therein, said auxiliary hook and said main hook openings being dimensioned so as to permit said auxiliary hook to pivot in said main hook opening between a parallel and inclined position with respect to the longitudinal axis of said main hook.

16. A double sheet-metal main hook having opposed upwardly directed terminal hook portions, an auxiliary hook having downwardly directed openings therein adapted to be detachably connected to and overhang the metal of said main hook below the opening of said terminal hook portion so as to be adapted to bear against the sides of said hook and prevent substantial movement between said auxiliary hook and said main hook in a direction perpendicular to the plane of said main hook.

17. A handling device including a main hook element formed with opposed terminal hook portions and a central opening having a slotlike opening extending downwardly from the lower end thereof, a plurality of auxiliary hooks adapted to be singly, selectively and detachably connected to the terminal hook portions and central portion of said main hook, said main hook being adapted to be used singly as a handling device and being adapted to be used with any number and combination of said auxiliary hooks.

18. A handling device including a main hook element having opposed terminal hook portions formed thereon and a central opening formed therein having a slotlike opening extending downwardly from the lower end thereof, and auxiliary hooks adapted to be detachably and pivotally connected to the terminal hook portions of said main hook element and detachably connected to the portion of said main hook element which defines said central slotlike opening.

19. A handling device including a main hook element having opposed terminal hook portions formed thereon and a central opening formed therein having a slotlike opening extending downwardly from the lower end thereof, auxiliary hooks adapted to be detachably and pivotally connected to the terminal hook portions of said main hook element and detachably connected to the portion of said main hook element which defines said central slotlike opening, and means for retaining said auxiliary hooks against the accidental displacement from said main hook element.

20. A handling device including a double sheet-metal main hook formed with outwardly and oppositely turned ends defining slotlike upwardly directed openings, and a pair of auxiliary hooks each having a downwardly directed slotlike opening adapted to overhang and bear against the sides of said main hook below said openings therein, said main hook being constructed so as to be selectively usable singly as a one or two-way hook-type handling device and with said auxiliary hooks from a three or four-way hook-type handling device.

21. A handling device including a double sheet-metal main hook formed with outwardly and oppositely turned ends defining slotlike upwardly directed openings, said main hook being provided with a central opening having a slotlike opening extending downwardly from the lower end thereof, and an auxiliary double hook having a downwardly directed slotlike opening adapted to overhang and bear against the sides of said main hook below said central slotlike opening therein, said main hook being constructed so as to be selectively usable singly as a one or two-way hook-type handling device and with said auxiliary hook as a three or four-way hook-type hanling device.

22. A handling device including a double sheet-metal main hook formed with outwardly and oppositely turned ends defining upwardly directed openings, said main hook being provided with a central opening having a slotlike opening extending downwardly from the lower end thereof, and a plurality of auxiliary double hooks each having a downwardly directed slotlike opening adapted to overhang and bear against the sides of said main hook below said outer openings and said central slotlike opening, said main hook being arranged and constructed so as to be selectively usable singly as a one or two-way hook-type handling device and in combination with said auxiliary hooks selectively from a three to a six-way hook-type handling device.

23. A handling device including a double sheet-metal main hook formed with outwardly and oppositely turned ends defining slotlike upwardly directed openings having substantially flat walls diverging upwardly with respect to each other, said main hook being provided with a central opening having a central slotlike opening extending downwardly from the lower end thereof, and a plurality of auxiliary double hooks each having a downwardly directed central slotlike opening adapted to overhang and bear against the sides of said main hook below said outer openings and said central slotlike opening, said auxiliary hooks when disposed in said outer main hook openings being detachably and pivotally connected to said main hook so as to be swingable between a parallel and inclined position with respect to a longitudinal axis of said main hook, said main hook being usable singly as a one or two-way hook-type handling device and selectively with said auxiliary hooks from a three to a six-way type handling device.

HANS ANDERSEN.

REFERENCES CITED

The following references are of record in the file of this patent:

UNITED STATES PATENTS

| Number | Name | Date |
| --- | --- | --- |
| 767,861 | Brown | Aug. 16, 1904 |
| 852,285 | Murray | Apr. 30, 1907 |
| 1,639,788 | Uline | Aug. 23, 1927 |
| 2,043,460 | Young | June 9, 1936 |